United States Patent [19]

Tohkairin

[11] Patent Number: 5,212,679
[45] Date of Patent: May 18, 1993

[54] DISK DRIVE FOR INFORMATION STORAGE

[75] Inventor: Kohichi Tohkairin, Yokoham, Japan

[73] Assignee: Fujitsu Limited, Kawasaki, Japan

[21] Appl. No.: 810,607

[22] Filed: Dec. 19, 1991

Related U.S. Application Data

[63] Continuation of Ser. No. 525,723, May 21, 1990, Pat. No. 5,140,578.

[30] Foreign Application Priority Data

May 24, 1989 [JP] Japan ..................... 1-130910

[51] Int. Cl.$^5$ ................ G11B 3/58; G11B 33/02
[52] U.S. Cl. ...................... 369/75.2; 369/71; 369/72; 360/97.02; 360/97.03
[58] Field of Search ............ 369/75.1, 75.2, 77.1, 369/77.2, 71, 72; 360/97.01, 97.03; 312/9, 10, 12; 24/572, 442

[56] References Cited

U.S. PATENT DOCUMENTS

| | | | |
|---|---|---|---|
| 4,194,225 | 3/1980 | Hasler | 360/97.02 |
| 4,725,904 | 2/1988 | Dalziel | 360/97.02 |
| 4,796,130 | 1/1989 | Shimanuki | 360/105 |
| 4,899,237 | 2/1990 | Tochiyama | 360/98.02 |

FOREIGN PATENT DOCUMENTS 62-188088 8/1987 Japan .................. 360/97.02

Primary Examiner—Eugene R. LaRoche
Assistant Examiner—Tan Nguyen

[57] ABSTRACT

A disk drive for information storage having at least one disk for recording data and a head actuator which includes a read/write head for reading and writing data to the disk. The disk drive includes an accessory member, such as a filter or spoiler, which is formed with an attaching part. A cabinet is used for housing therein the disk, head actuator, and accessory member. The cabinet is divided into a first cabinet part and a second cabinet part, such that the attaching part of the accessory member is sandwiched or interposed between the first and second cabinet parts and located in position inside the cabinet when the two cabinet parts are joined together. Thus, the accessory member can be attachably positioned to the disk drive inside the cabinet without using screws or other timeconsuming and costly assembly techniques.

17 Claims, 5 Drawing Sheets

DISK DRIVE FOR INFORMATION STORAGE

This application is a continuation of application Ser. No. 07/525,723, filed May 21, 1990, U.S. Pat. No. 5,140,578 issued Aug. 18, 1992.

BACKGROUND OF THE INVENTION

This invention relates to a disk drive for information storage, such as a magnetic disk drive and an optical disk drive. More particularly, this invention relates to an apparatus for attaching an accessory member, such as a spoiler or filter, to a cabinet of the disk drive.

The magnetic disk drive and optical disk drive are used as external information storages of a computer system. In recent years, the recording density of disk media has increased, and if dust enters the cabinet of the disk drive, trouble may occur, such as a head crash or disable data recovery. Therefore, since fixing of parts for the disk drive in the cabinet, such as by screws, will cause dust generation, it is desirable to employ a different method other than attaching by screws the parts into the cabinet. Conventionally, an accessory member, such as a spoiler or a filter, is attached inside the cabinet of the disk drive. The spoiler regulates the flow of air generated by rotation of the disks and equalizes temperature differences in air flow between the disks. Meanwhile, the filter collects dust generated within the cabinet of the disk drive.

FIG. 1 is a partial schematic cross-sectional view of a conventional disk drive illustrating integration of an accessory member in a disk drive cabinet. In this figure, a filter integrating spoiler 2 includes a spoiler 25 and a filter 26. The filter integrating spoiler 2 is included within a cabinet 1 of the disk drive in combination with a plurality of disks 3 and a head actuator (not illustrated). The spoiler 25 has a plurality of parallel fins 27 located between the plurality of disks 3. The cabinet 1 is composed of a cover 11 and a base 12. When the various parts of the disk drive and accessory member are attached to the cover 11 and base 12 the cover 11 and base 12 are then joined together, by fastening means, such as by screw 6.

Conventionally, the filter integrating spoiler 2 is fixed to the base 12 by screws 9. Specifically, through holes 5 are formed at the filter integrating spoiler 2 fixing position of the base 12 and the screws 9 are then used to fix the filter integrating spoiler 2 to the inside of the base 12 through the through holes 5.

In this type of disk drive, an accessory member such as the filter integrating spoiler 2 has been fixed within the base 12 by the screws 9. Fixing by screws 9 are effective for obtaining sufficient fixing strength, but the through holes 5 must be bored through the base 12 for use in fixing the spoiler 2 by the screws 9. Therefore, dust generated when the screw holes 5 are formed still remains even after cleaning efforts. This dust will enter the cabinet 1 through the through holes 5 and, moreover, it is probable that dust is also generated during the screwing assembly step.

SUMMARY OF THE INVENTION

Accordingly, it is a primary object of the present invention to provide an improved disk drive for achieving both a high data storage density and a high safety for the stored data.

Another object of the present invention is to provide a disk drive for information storage that reduces generation of dust inside of a cabinet of the disk drive.

A further object of the present invention is to provide a disk drive for information storage that fixes an accessory member to a cabinet of the disk drive without using screws.

It is another object of the present invention to provide a disk drive for information storage that fixes an accessory member to a cabinet of the disk drive with sufficient strength, but without using screws.

Yet another object of the present invention is to provide a disk drive for information storage with an accessory member that can achieve a quicker and less expensive assembly procedure.

Additional objects and advantages of the invention will be set forth in part in the description which follows, and, in part, will be obvious from the description, or may be learned by practice of the invention. The objects and advantages of the invention may be realized and obtained by means of the instrumentalities and combination particularly pointed out in the appended claims.

To achieve the foregoing objects and in accordance with the purpose of the invention, as embodied and broadly described herein, there is provided a disk drive for information storage comprising: (a) a disk for recording data; (b) a head actuator including a read/write head for reading and writing data to the disk; (c) an accessory member having an attaching part; and (d) a cabinet for accommodating the disk, head actuator and accessory member, the cabinet being divided into a first cabinet part and a second cabinet part, and the attaching part of the accessory member being interposed between the first and second cabinet parts when the first cabinet part and the second cabinet part are joined.

In a preferred embodiment, the cabinet is divided into the first cabinet part comprising the cover and the second cabinet part comprising the base at the position for attaching the accessory member. In addition, the cabinet has a protruding type pin adjacent to the accessory member attaching position, and the accessory member has a fitting part for engagement with the pin.

Preferable, the cabinet has an elastic force packing at a joining surface of the first cabinet part and the second cabinet part for hermetically sealing the inside of the cabinet when the first and second cabinet parts are joined together.

In accordance with the invention, there is further provided a special method for assembling the disk drive described above.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Reference will now be made in detail to the present preferred embodiment of the invention, examples of which are illustrated in the accompanying drawings.

Figure 1:
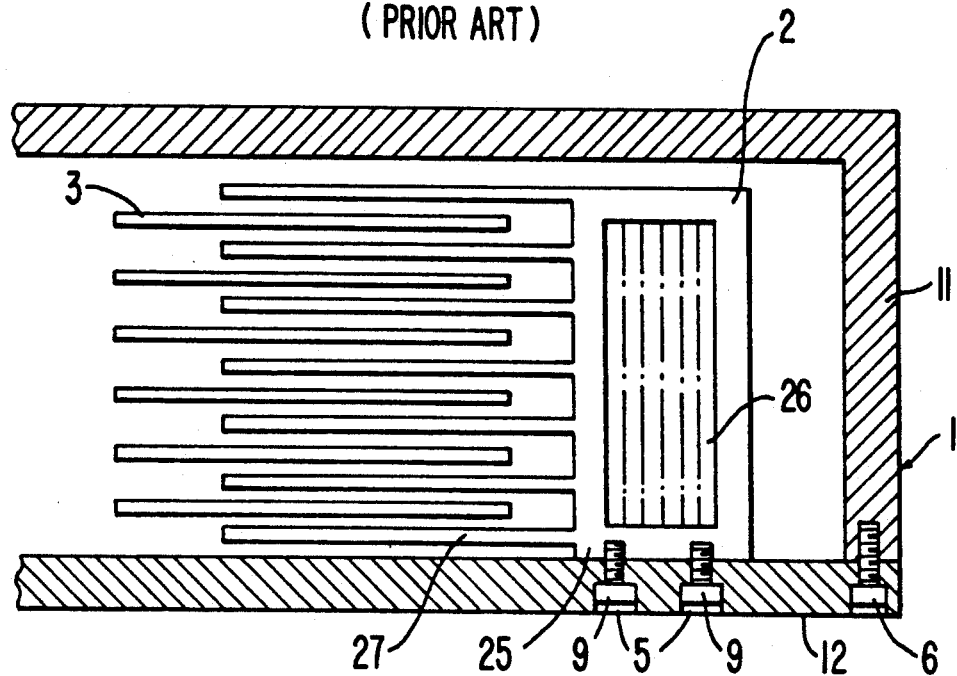
FIG. 1 is a partial schematic cross-sectional view of the primary parts of a conventional disk drive.
Figure 2:
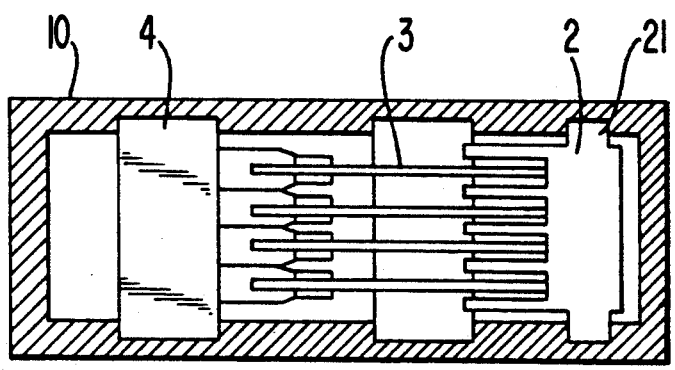
FIG. 2 is a top plan view of the primary parts of a disk drive using the present invention.
Figure 3:
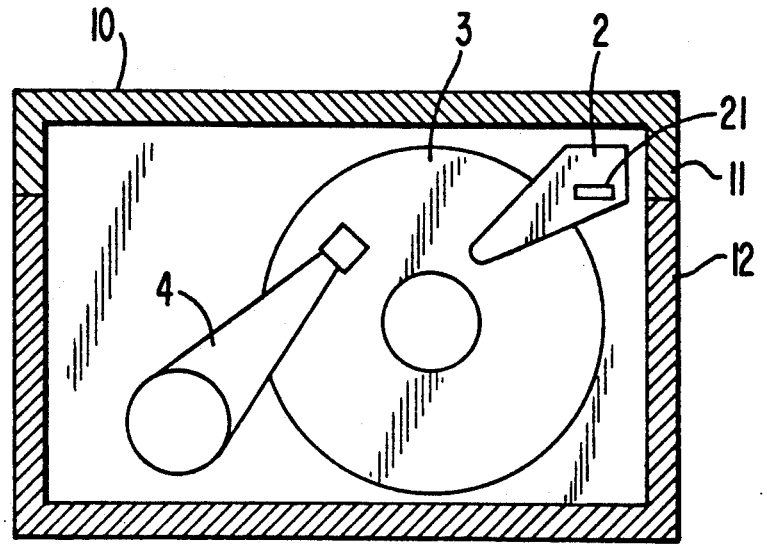
FIG. 3 is a cross-sectional view of the primary parts of a disk drive using the present invention.

FIG. 2 is a top plan view of the primary parts of a disk drive using the present invention, and FIG. 3 is a cross-sectional view of the primary parts of a disk drive using the present invention. A disk drive includes a cabinet 10, an accessory member 2, a plurality of disks 3 and a head actuator 4. Cabinet 10 is formed with a structure to be divided into a first cabinet part 11 and second cabinet part 12 at the position for attaching an accessory member 2. The disks 3 and the head actuator 4 are mounted in the second cabinet part 12. Meanwhile, the accessory member 2, such as a spoiler or a filter, has a protruding part 21 adjacent to the position for attaching or fitting the member 2 with the cabinet 10. Namely, the accessory member 2 can be attached or fixed to the cabinet 10 by joining together the first and second cabinet parts 11 and 12 with the protruding part 21 of the accessory member 2 being interposed between the cabinet parts 11 and 12.

According to the present invention, when the first cabinet part 11 and the second cabinet part 12 are joined, the first cabinet part 11 and the second cabinet part 12 are fixed interposing the protruding part 21 of the accessory member 2 between them. Therefore, the accessory member 2 can be located in the cabinet with sufficient strength. Accordingly, it is no longer necessary to form through holes in the cabinet for screwing an accessory member to the inside of the cabinet, thus eliminating a cause of generating dust and dust entering the cabinet.

Figure 4:
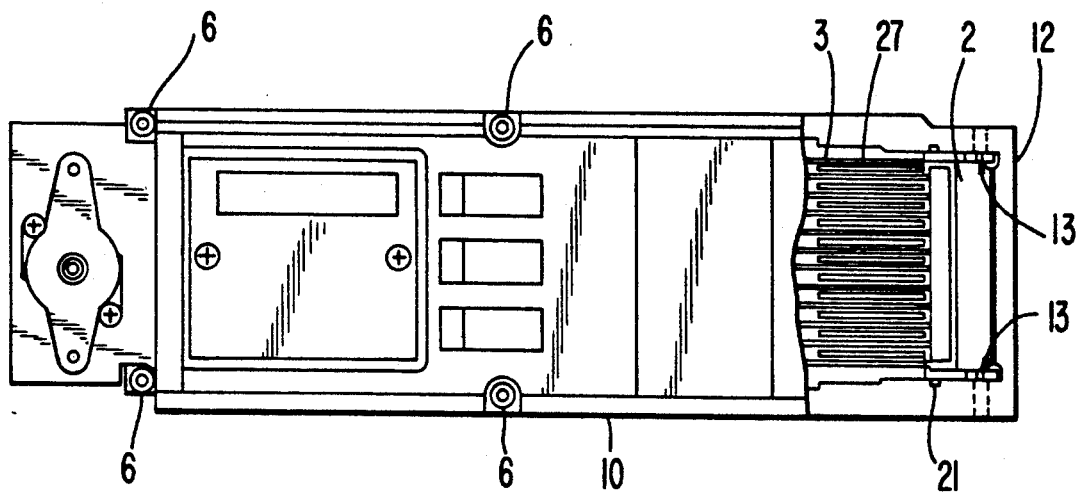
FIG. 4 is a partial cut-a-way, top plan view illustrating a preferred embodiment of a disk drive in accordance with the present invention.
Figure 5:
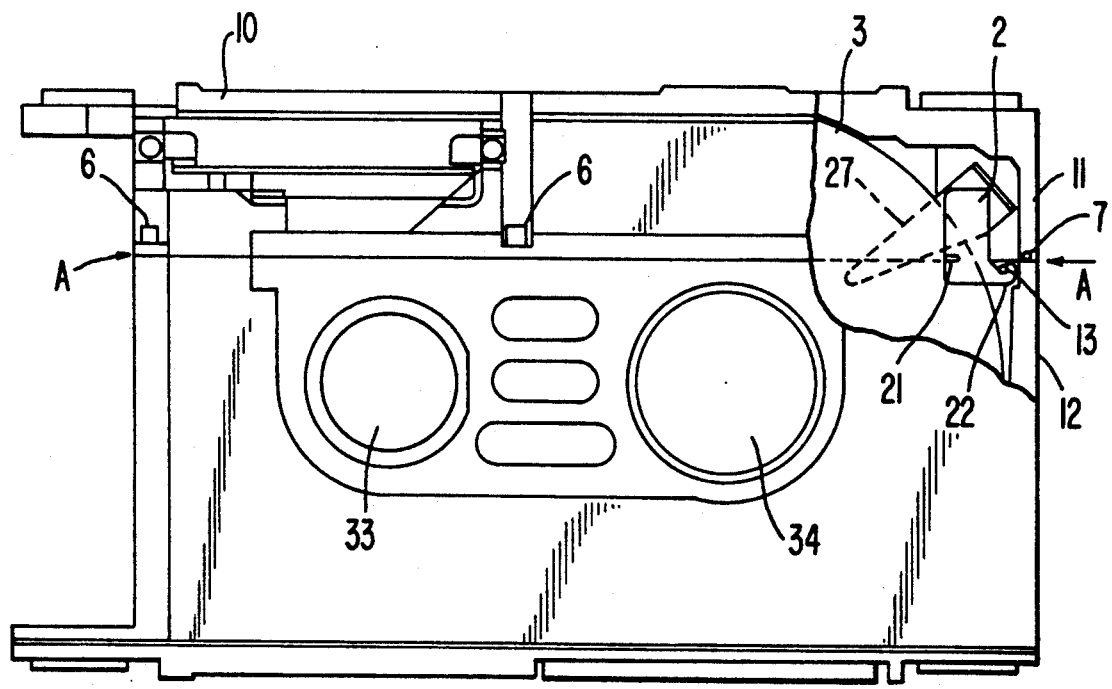
FIG. 5 is a partial cut-a-way, cross-sectional view illustrating a preferred embodiment of a disk drive in accordance with the present invention.
Figure 6:
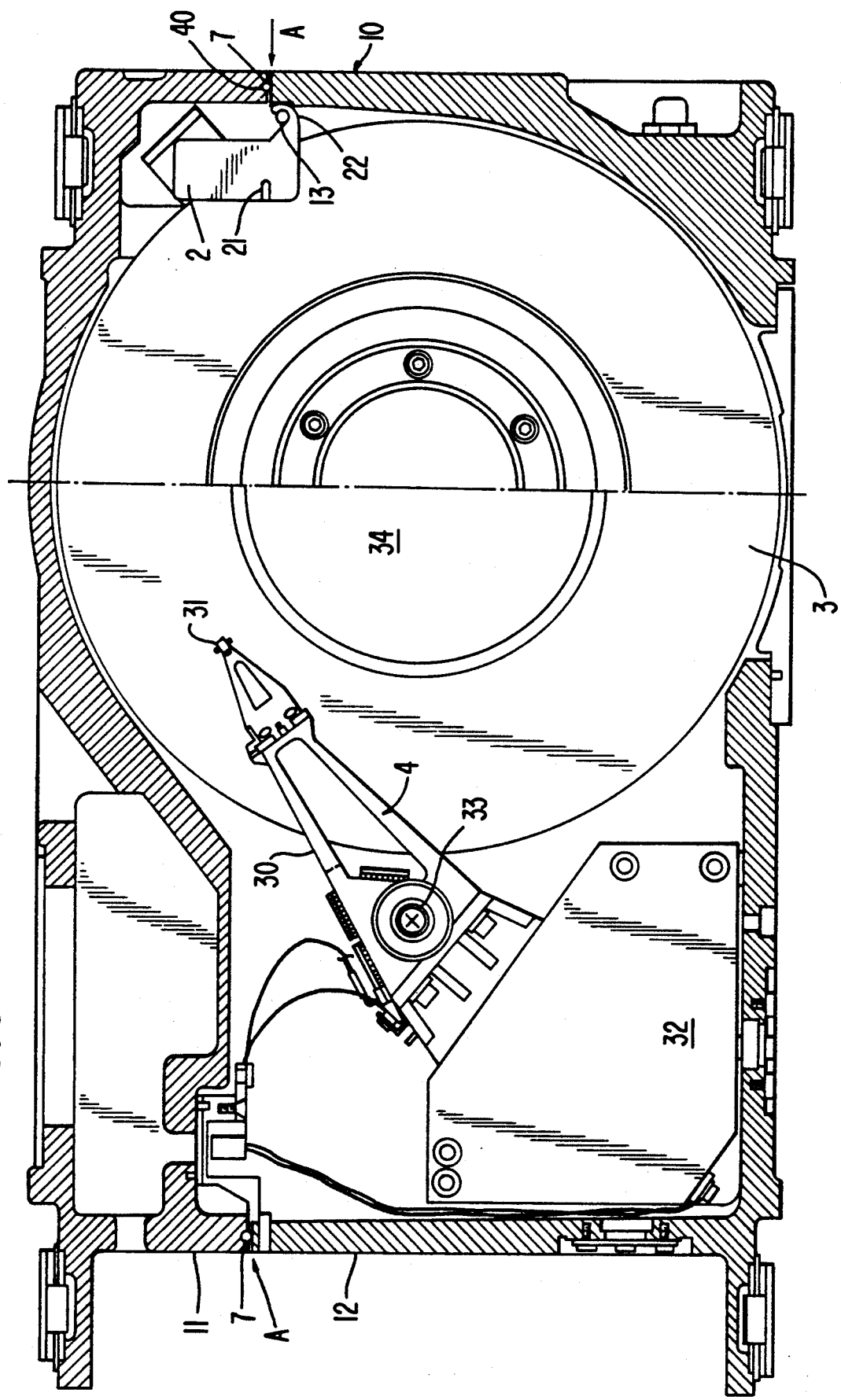
FIG. 6 is a cross-sectional view illustrating a preferred embodiment of a disk drive in accordance with the present invention.

FIG. 4 is a partial cut-a-way, top plan view illustrating an embodiment of a disk drive of the invention. FIG. 5 is a partial cut-a-way, cross-sectional view illustrating the embodiment of the disk drive of the invention. FIG. 6 is a cross-sectional view illustrating the embodiment of the disk drive of the invention. A cabinet 10 has a structure which is divided into a particularly configured cover 11 and base 12. The cover 11 and base 12 can be joined by screws 6 using non-through holes at the locations shown in FIGS. 4 and 5 after the various disk drive parts are assembled in the cabinet 10. The disks 3, as shown in FIG. 4, comprise a plurality of eleven disks which are rotatably mounted on the same axis by a spindle 34 (FIG. 5) and are spaced apart from one another. The disks 3 are mounted to the base 12 of the cabinet 10 through the spindle 34. The disks 3 are rotatable at a constant high speed, for example 3600 rpm, by a spindle motor (not shown) located within or inside the spindle 34 itself. A head actuator 4 is rotatably mounted to the base 12 of the cabinet 10 through a spindle 33 for pivotal movement around the center axis of the spindle 33. The head actuator 4 includes a plurality of head arms 30, each head arm 30 having a read/write head 31 located at a point of the head arm 30 for reading or writing of data to a disk 3. The head actuator 4 also can position the read/write heads 31 over the disks 3 by a voice coil motor 32 which is provided at a lower right side of the head actuator 4 as shown in FIG. 6. Further details and description of this type of disk drive is disclosed in U.S. Pat. No. 4,899,237 to Kazunori et al. issued on Feb. 6, 1990.

In accordance with an embodiment of the invention and as shown in FIGS. 4–6, a protruding type pin 13 is provided for use in properly locating the accessory member, such as filter integrating spoiler 2, in relationship to the other parts of the disk drive and to the cabinet 10. It may be desirable for further reducing dust generation that the pin 13 be formed integral with the cabinet 10. In this embodiment, however, two through holes (not shown) are formed in the base 12 and two pins 13 are inserted into the corresponding holes. In this case, the through holes formed in the base 12 are bored as smooth through holes. Therefore, any dust remains therein or the dust can be removed easily by preassembly cleaning. Moreover, since the pin 13 can be formed with a tapered edge (not shown) for engaging the through hole with pressure, it is unlikely that dust existing between the through hole and pin 13 can enter the cabinet 10 when a change of pressure occurs within the cabinet.

Figure 8:
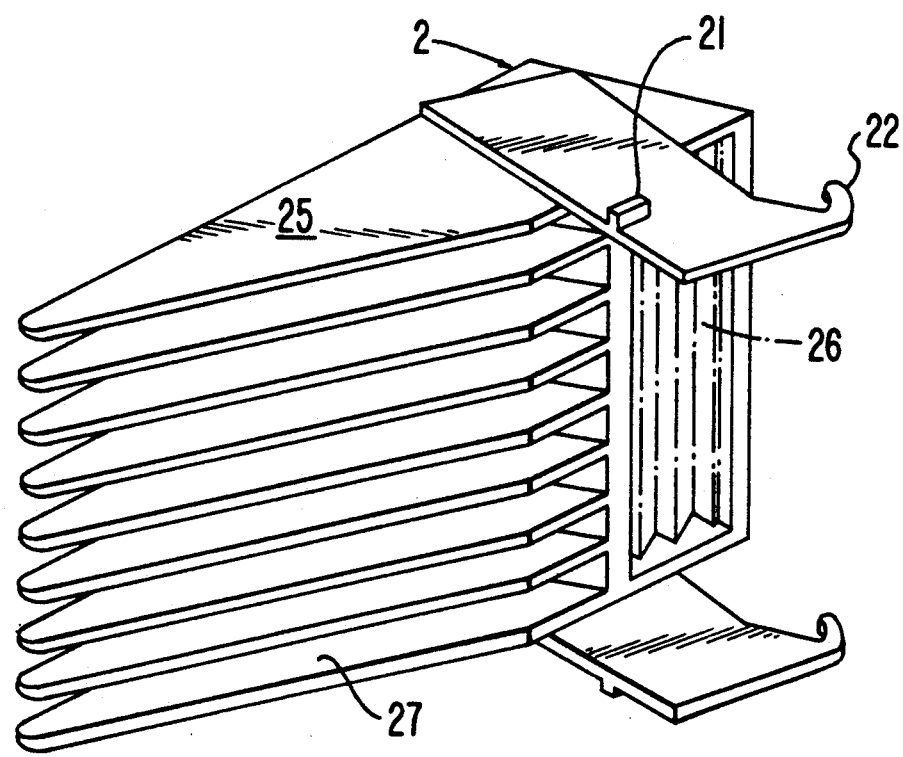
FIG. 8 is a perspective view illustrating an embodiment of a filter integrating spoiler of the disk drive in accordance with the present invention.

The reference numeral 2 designates a filter integrating spoiler, as shown in FIGS. 4 through 6. FIG. 8 is a perspective view of a preferred embodiment of a filter integrating spoiler 2 for the invention. The filter integrating spoiler 2 comprises a spoiler 25, a filter 26, a fitting part 22 for engaging the positioning pin 13 and a protruding part 21 as a part thereof. The spoiler 25 has a plurality of fins 27 located between the disks 3 after assembly of the disk drive. As shown in FIG. 4 through FIG. 6, the fitting part 22 is provided for engagement with the locating pin 13 of the base 12 during assembly. Also during assembly, the protruding part 21 is sandwiched or interposed between the cover 11 and base 12 when the cover 11 and the base 12 are joined.

The filter integrating spoiler 2 is located opposite to the head actuator 4 at the upper side of the disk drive as shown in FIGS. 3 and 6, and the fins 27 of the spoiler 2 are interposed between the disks 3 as shown in FIG. 4. Therefore, the cabinet 10 can be divided horizontally at the height of the fitting position of the filter integrating spoiler 2. The divided upper part of the cabinet 10 thereof is the cover 11 and the lower part of the cabinet is the base 12. Moreover, since the filter integrating spoiler 2 is attached to the upper portion of the base 12, the dividing position of the cabinet 10, shown by the reference letter "A" in FIGS. 5 and 6, is located more horizontally upward than in conventional disk drive cabinets. Therefore, when the cover 11 is removed, a smaller portion of the disks 3 and head actuator 4 is exposed to the outside.

Figure 7:
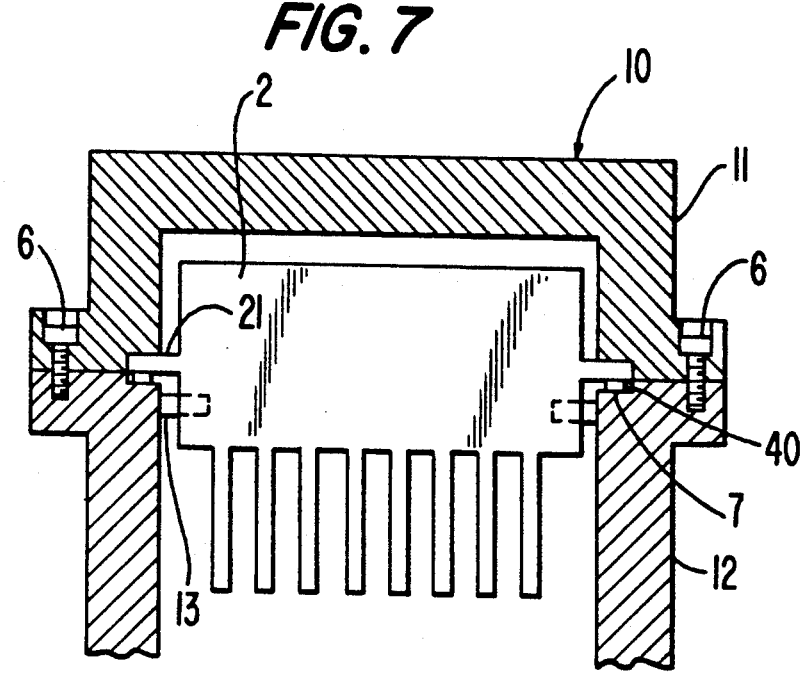
FIG. 7 is a cross-sectional view of an embodiment of the filter integrating spoiler with an attaching part for the disk drive in accordance with the present invention.

FIG. 7 is a cross-sectional view of an embodiment of the filter integrating spoiler 2 showing in further detail the attaching part for the disk drive. The fitting part 22 of the filter integrating spoiler 2 (as shown in FIG. 8)

engages with the positioning pin 13 of the base 12, while the protruding part 21 of the filter integrating spoiler 2 is interposed and fixed between the cover 11 and base 12 at the joining surface of the covered base.

As also shown in FIGS. 6 and 7, an elastic packing member 7, such as that formed of rubber, is provided at the joining surface between the two parts of the cabinet for hermetically sealing the inside of the cabinet 10 when the base 12 and cover 11 are joined together. The packing 7 is fitted into a groove 40 formed in either the joining surface of the base 12 or cover 11, running around the circumference of the joining area of the cover 11 and base 12. When the protruding part 21 of the filter integrating spoiler 2 is sandwiched by the cover 11 and base 2, the packing 7 is also sandwiched by the cover 1 and base 12 in combination with the protruding part 21. Namely, to reduce difficulty in mechanical accuracy and accurate fitting of the protruding part 21 of the filter integrating spoiler 2 into the cover 11 or base 12, the protruding part 21 of the filter integrating spoiler 2 is sufficiently fixed to the cabinet 10 with assistance of the elastic force of the packing 7.

As shown in FIG. 4, FIG. 5 and FIG. 7, the cover 11 and base 12 are fixed by screws 6 in the locations identified after the parts of the disk drive are assembled within the cabinet 10. Fixing of the cabinet 10 by screws 6 is carried out at the outside of the cabinet 10 and any dust possibly generated during fixing by the screws 6 does not enter into the hermetically sealed cabinet.

Figure 9A:
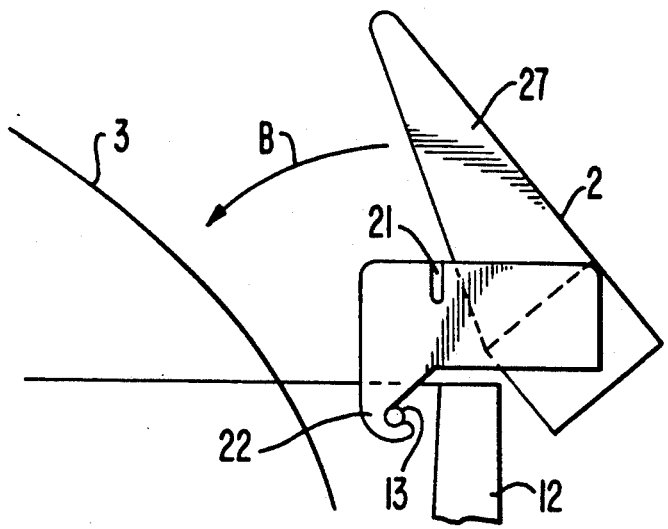
FIG. 9(A) through FIG. 9(C) are cross-sectional views of primary parts of a disk drive in accordance with the invention, showing a method for assembling a filter integrating spoiler into a disk drive cabinet in accordance with the invention.
Figure 9B:
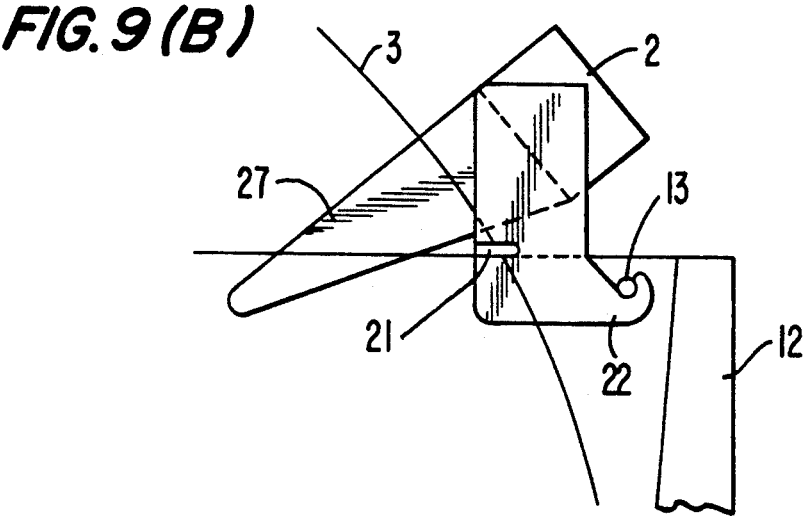
Figure 9C:
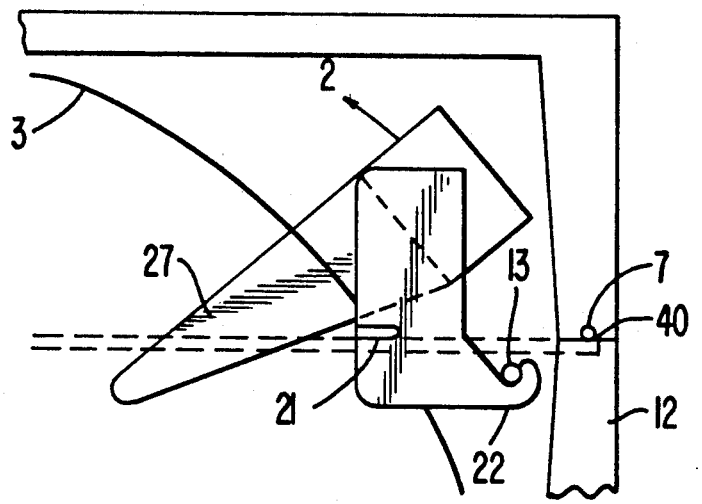

FIG. 9(A) through FIG. 9(C) are partial cross-sectional views of primary parts of the disk drive using the invention, showing a method for assembling the filter integrating spoiler 2 into the disk drive cabinet 10. As shown in FIG. 9(A), after the disks 3 and head actuator 4 are mounted to the base 12, the fitting part 22 of the filter integrating spoiler 2 is engaged with the pin 13 of the base 12. Next, the filter integrating spoiler 2 is rotated in the direction indicated by the arrow "B" using the pin 13 as the axis. As shown in FIG. 9(B), when the protruding part 21 of the filter integrating spoiler 2 engages the joining surface of the base 12 and the filter integrating spoiler 2 stops rotation, the fins 27 of the spoiler 2 are located between corresponding disks 3 as shown in FIG. 9(B). Finally, as shown in FIG. 9(C), the cover 11 is applied to the top of the base 12 at the joining surface with the protruding part 21 interposed therebetween and the cover 11 and base 12 are then fixed by the screws 6 as shown in FIG. 4, FIG. 5 and FIG. 7.

The present invention provides a fitting or locating part 22 for the accessory member of a disk drive, in addition to a protruding or attaching part 21, thereby facilitating fitting and attaching of the accessory member 2 inside the cabinet 10 using pin-rotation and sandwiching techniques without additional screws or other more time-consuming and costly assembly procedures. Moreover, while the preferred embodiment of the present invention described and shown above utilizes a filter integrating spoiler as the accessory member, the disk drive may be provided individually with a filter and a spoiler, or provided with only one of these accessory members. It is also possible, in a manner similar to that described and shown for the present embodiment, to attach a different accessory member other than a filter or spoiler within the cabinet of the disk drive.

Thus, it is intended that the present invention cover the modifications and variations in the disk drive for information storage in accordance with the invention within the scope of the appended claims and their equivalents and without limitation to the different environments in which to use the disk drive.

What is claimed:

1. A disk drive comprising:
 (a) a disk for recording data;
 (b) a head actuator including a read/write head for reading and writing data to the disk;
 (c) an accessory member having an attaching part and a fitting part;
 (d) a cabinet for accommodating the disk, head actuator and accessory member, the cabinet being divided into a first cabinet part and a second cabinet part, wherein the first and second cabinet parts have walls for being joined together at a joining surface, and the attaching part of the accessory member is sandwiched between the first and second cabinet parts at the joining surface when the first and second cabinet parts are joined; and
 (e) a positioning member positioning said accessory member to said cabinet by engagement with the fitting portion of said accessory member.

2. The disk drive of claim 1, wherein the cabinet has a protruding type pin adjacent to the attaching position of the accessory member, and wherein the fitting part of the accessory member engages with the pin.

3. The disk drive of claim 1, wherein the cabinet has an elastic force packing at the joining surface of the first cabinet part and the second cabinet part for hermetically sealing the inside of the cabinet when the first and second cabinet parts are joined together.

4. The disk drive of claim 3, wherein the first cabinet part and the second cabinet part are joined by screws.

5. The disk drive of claim 1, wherein the first cabinet part comprises a cabinet base and the second cabinet part comprises a cabinet cover, and the disk and the head actuator are mounted in the cabinet base.

6. The disk drive of claim 1, wherein the accessory member is a filter for collecting dust generated within the cabinet.

7. The disk drive of claim 1, wherein the accessory member is a spoiler for regulating a flow of air generated by rotation of the disk.

8. The disk drive of claim 1, wherein the accessory member is a filter integrating spoiler.

9. A disk drive comprising:
 (a) a plurality of disks for recording data;
 (b) a head actuator having a plurality of parallel head arms so that at least one head arm is located between a respective pair of the disks, each head arm having a read/write head for reading and writing data to the disk;
 (c) an accessory member having an attaching part and a fitting part;
 (d) a cabinet for accommodating the disks, head actuator and accessory member, and the cabinet being divided into a cover and a base, wherein the cover and base have walls for being joined together at a joining surface, and the attaching part of said accessory member is sandwiched between the cover and base at the joining surface when the cover and base are joined together; and
 (e) a position member positioning said accessory member to said cabinet by engagement with the fitting part of said accessory member.

10. The disk drive of claim 9, wherein the base has a protruding type pin adjacent to the attaching position of the accessory member, and wherein the fitting part of the accessory member engages with the pin.

11. The disk drive of claim 9, where the cabinet has an elastic force packing at the joining surface of the cover and base for hermetically sealing the inside of the cabinet when the cover and base are joined together.

12. The disk drive of claim 11, wherein the cover and base are joined by screws.

13. The disk drive of claim 9, wherein the disk and the head actuator are mounted in the base.

14. The disk drive of claim 9, wherein the accessory member is a filter located inside of the cabinet and outside of the disks for collecting dust generated within the cabinet.

15. The disk drive of claim 9, wherein the accessory member is a spoiler located over the disks for regulating a flow of air generated by rotation of the disks.

16. The disk drive of claim 15, wherein the spoiler has a plurality of parallel fins so that at lest one fin can be located between a respective pair of the disks.

17. The disk drive of claim 9, wherein the accessory member is a filter integrating spoiler located inside of the cabinet and outside of the disks, and the spoiler has a plurality of parallel fins substantially extending from outside of the disks towards the center of the disks.

* * * * *